May 23, 1950
A. N. GOLDSMITH
TELEVISION SYSTEM
Filed Oct. 12, 1944
2,509,038
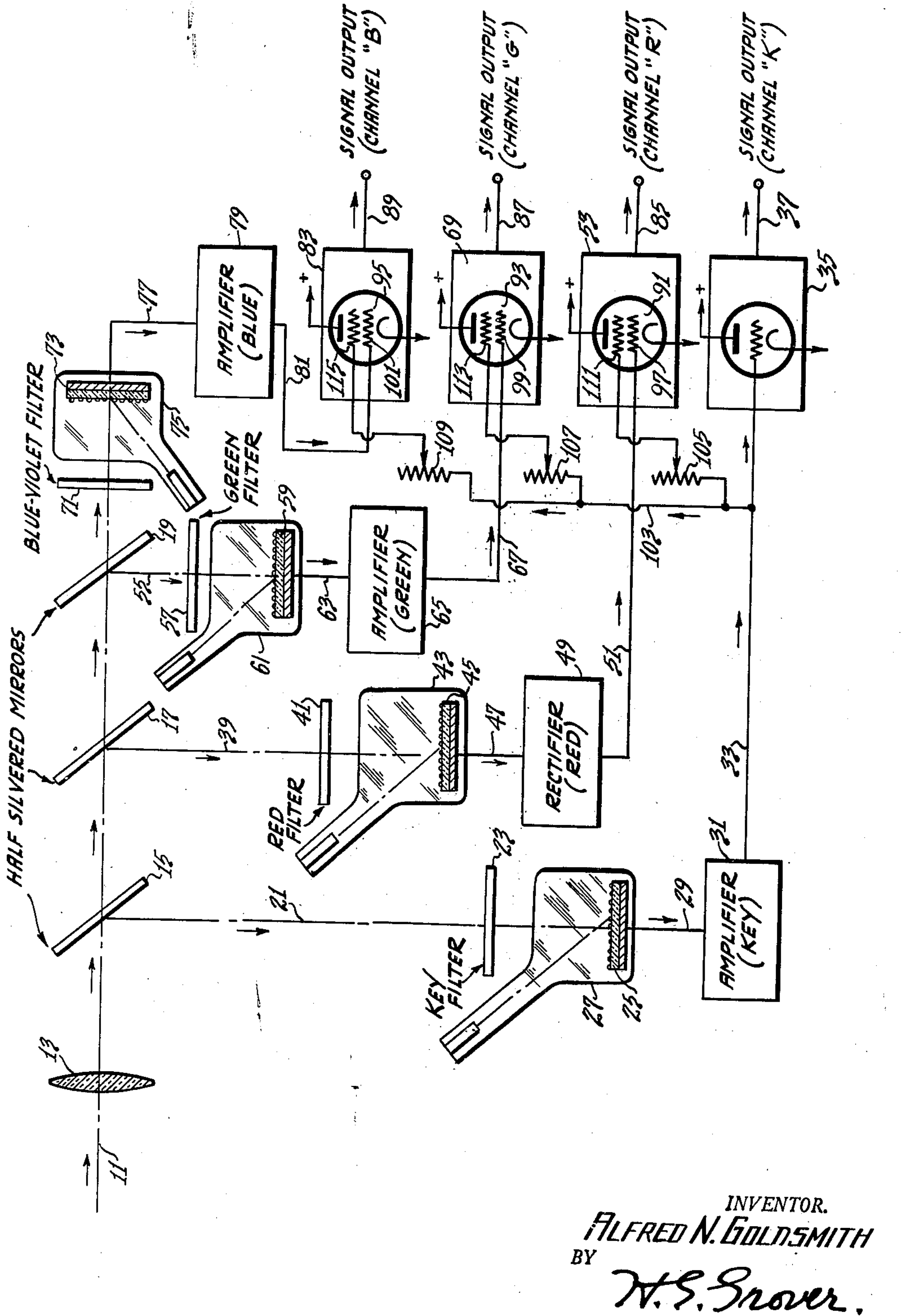
INVENTOR.
ALFRED N. GOLDSMITH
BY
H. S. Grover.
ATTORNEY

UNITED STATES PATENT OFFICE 2,509,038

TELEVISION SYSTEM

Alfred N. Goldsmith, New York, N. Y., assignor to Radio Corporation of America, New York, N. Y., a corporation of Delaware Application October 12, 1944, Serial No. 558,357

9 Claims. (Cl. 178—5.4)

This invention relates to systems and methods for transmitting television images and particularly to systems wherein provisions are made for transmitting the television images in accordance with the color representations or components from which the picture is formed. In its more particular application, the invention provides for the development of image signals corresponding to a key image and the utilization of these key image signals to augment and improve the color rendition and brilliancy of the finally produced television images which are observable at receiving or monitoring points.

In most presently utilized color television systems of the so-called additive type, it has been customary to employ three primary or component color images superimposed either cyclically or simultaneously to reproduce a color image having substantially the same colors as the object of which the image is a representation. To provide this type of image production, signals are developed at transmitting points to represent the image in each of its selected component or primary colors. Usually, these representations portray the image in signals representative of red, green and blue-violet, although two-color systems have been utilized. Two-color systems usually suffer from relatively inferior fidelity of color reproduction and thus, for the purposes of these considerations, reference will be made to a tricolor system, although it is to be understood that the same general principles herein involved carry over to two-color systems.

It is known, of course, that it is theoretically possible to achieve reasonably close to perfect color reproduction of tricolor images under idealized conditions. From a practical standpoint, however, these conditions are not obtained and there is actually considerable divergence from such ideal conditions due to many causes, among which are the failure of the analyzing filters to meet theoretical requirements, as well as the variance in spectral sensitivity of the light sensitive medium or camera tube of the system and, in addition to other causes, the lack of suitable panchromatic spectral response characteristics of the image producing medium becomes a substantial factor.

Because of these facts, the quality of the produced image or picture tends to vary and depart from perfection and, accordingly, to overcome these difficulties, the present invention seeks to provide an additional component image which will result from a neutral black and white depiction which may be termed the key image, and which is utilized to improve the color reproduction of the television image by increasing the brilliance in the highlights and the density of the shadow areas.

In a related application filed by this applicant and identified as Serial No. 455,556, filed August 21, 1942, now Patent No. 2,423,769, for a "Color television system" a system of a somewhat related nature has been disclosed and the use of key images to control the image or video signal transmission has been set forth. The present invention is directed to the same general field of operations and it also deals with a system and method of improving color television images by adding to the tricolor component color images a further black and white image or a key image, which as above indicated, is broadly representative only of the highlights and shadows of the object orthochromatically viewed—that is, viewed relative to brightness only and irrespective of actual color values. Alternatively, the key image may correspond to infra-red, visible colored or ultraviolet viewing of the object, and the selection of the color corresponding to the brightness indicia of the key image, while of great practical effect, will not in any way affect the aforestated conditions.

In television systems of this character, in order to keep the shadows of the resultant image or picture deep so that they are near-black, for instance, and to keep the highlights brilliant so that they are near-white, for instance, as well as to add detail to the tricolor image segregation, the system is based upon an operation such that the tricolor images produced are caused alone to produce a chromatically correct but slightly dimmer image, and of lower gradation range, than would otherwise be used. As is well known, the gradation range may be taken as the ratio of the brightness of the most brilliant highlight of the image to the brightness of its deepest shadow. The key image above explained when then added causes the shadows to remain satisfactorily deep but the highlights which had previously been limited in brightness are brightened by the key image so as to produce a more brilliant image with a longer gradation range which substantially improves the detail of the resultant image. To the same extent, shadow detail is also increased.

According to the present invention, in order to maintain a suitable and desired balance between the individual component color images on the one hand, and the key images on the other hand, suitable means are provided whereby each of the component color images may be controlled in brightness at every part thereof and at all times in accordance with a corresponding brightness of the related or corresponding point or elemental area of the key image. In the present operation, as herein to be explained, provision is made for separating the image to be televised into such components that a key image always results, as do color separation components representative of the image in its selected component or primary colors. Separate trains of image or video signals are concurrently developed by means of separate camera tubes upon which each selected color image is projected. The scanned operations and the translation of light values into signal impulses are appropriately carried forward in such manner that like elemental points or areas of each component color image simultaneously produces a signal output. These separate signal outputs are then simultaneously and concurrently transmitted with the output level of the image or video signal transmission representative of the chosen component or primary colors being determined in accordance with the signal output due to the key image alone.

It, therefore, becomes an object of this invention to provide an improved method by which television transmissions may be carried forward in color.

Another object of the invention is that of providing simultaneous transmission of television images in each of the chosen component colors, together with the simultaneous transmission of signals representative of the key image with the said latter signals serving also simultaneously to modify or augment the signals representative of the separate color versions of the image.

Still further objects of the invention are those of providing for improving the detailed resolution and delineation of television image transmissions in all their parts by adding thereto the realism and naturalness of the color reproduction, as well as increasing substantially the contrast and gradation range of the colored images as viewed at receiving and/or monitoring points.

Still other objects of the invention are those of providing for the simultaneous transmission of component color and key images in a color television system where the scanning of all of the several image components occurs simultaneously therewith.

Other objects of the invention are those of providing a system of color television in which one or more of the known defects of prior art systems are overcome while at the same time, providing for increased efficiency and fidelity of operation, as well as a general simplification of the apparatus.

Other objects of the invention will, of course, become apparent and suggest themselves to those skilled in the art to which the invention is directed when the following specification is read in connection with the accompanying drawing. In the drawing, the light of an optical image (not shown), of which is desired to produce a colored replica at receiving or monitoring points is projected along a path 11 through a suitable optical system conventionally represented at 13 so as to come within the path of the several half-silvered mirrors—15, 17 and 19 respectively. Each of the mirror elements 15, 17 and 19 is half silvered so that substantially half of the light along the path 11 passes through the mirror in the directions indicated by the arrows and the remaining half of the light is reflected from the mirrors, as indicated by the arrows adjacent to the light paths.

The light passing along the path 11 which is reflected through the mirror 15 along the path 21 may be considered as passing through a key filter element 23 to influence the light sensitive mosaic 25 of a suitable and conventionally represented camera tube 27. The camera tube 27 is preferably, although not necessarily, of the type known in the art as a storage tube, and it provides for the conversion of impinging light into electrostatic charges which are removed and converted into signal energy pulses under the influence of a scanned cathode ray beam. Various tubes of this type are known and some of these have been disclosed and their operation explained in an article entitled "The Orthicon, a television pick-up tube," published by Messrs. Rose and Iams in the "RCA Review" for October 1939, commencing at page 186. Accordingly, further details of this tube and the operation thereof to produce the image or video signals are considered to be unnecessary; and, likewise, within the disclosure of this invention it is believed unnecessary to make further detailed explanation of the character of any of the mosaic electrodes utilized in any camera tube herein to be disclosed, or to illustrate any means specifically for producing and deflecting the scanning beams relative to the target mosaic.

In considering this disclosure and the several camera tubes, such as tube 27 and other tubes later to be explained in more detail, it should be understood that the scanning of the mosaics of the tubes occurs in all instances synchronously and in such manner that each mosaic is so scanned that related or homologous image points on each are simultaneously passed over by each of the scanning beams to produce the signalling output currents.

With the arrangement shown by which the light of the image passes along the paths 11 and 21 and through the filter 23 to the mosaic 25 of the camera tube 27, the scanning beam, when tracing the mosaic, produces the output signals which are passed along the conductor 29 and into an implifier unit 31 which may be considered as the key image amplifier in that the signals amplified are representative of the key image. The amplifier unit 31 is of any well known type suitably designed for the amplification of a relatively wide band of frequencies. Many amplifiers of this general type are well known in the art and further details thereof need not be discussed. Many of the theoretical considerations for amplifiers of this general type, however, have been set forth in the publication entitled "Analysis and design of video amplifiers," written by Messrs. Seeley and Kimball, and published in the "RCA Review" for January 1939, commencing at page 290, to which reference may herein be made. Nevertheless, any well known forms of wide band amplifiers may be used with good efficiency.

The resultant signals representative of the image are then passed along the output conductor 33 and into a further output amplifier conventionally represented at 35, from which the amplified output is fed to a signal output channel herein identified as channel "K" by way of conductor 37.

A portion of the output from the key amplifier 31 is also used in a manner later to be explained to control other amplifiers of the system.

Simultaneously with the scanning of the key image in the camera tube 27, the optical image passed along the path 11 which is passed through the half silvered mirror 15 and is reflected from mirror 17 along an optical path 39 is passed through a filter element 41 which is herein identified as the "red filter." This filter is so arranged as to pass the red component color image into the camera tube 43 to influence the mosaic electrode thereof, which electrode is conventionally represented at 45. The mosaic 45 is scanned concurrently and synchronously with the scanning of the mosaic 25 and all other masaics of the camera tubes in the system and in accordance with the charges acquired by the mosaic 45 due to the impinging red light, image signals will be passed along the conductor 47 and into the amplifier 49 which is herein identified as the red amplifier in that it amplifies signals representative of the red components of the image. The amplifier 49 may be of the general character above referred to in the discussion of the key amplifier 31. Output signals from the amplifier 49 are passed along the conductor 51 and into an output amplifier 53 in a manner which will later be explained.

Also simultaneously with the activation or influencing of the mosaic 45 by the red image and the mosaic 25 by the key image, the image light which is passed through both of the mirrors 15 and 17 to reach the mirror 19 and which is reflected therefrom along the optical path 55 is passed through a green filter 57 to reach the mosaic electrode 59 of the third camera tube represented at 61. When a scanning operation in this tube is carried forward synchronously simultaneously with and cophaseally with that of the other tubes, signals representing the green image are passed along the conductor 63 into an amplifier 65 designated as the green amplifier in that the signals amplified represent green in the image. This amplifier is of the same general character as amplifiers 31 and 49 and the output signals therefrom are directed through the conductor 67 to control the operation of an output amplifier 69, as will later be explained.

Lastly, the light image which passes through each of the mirrors 15, 17 and 19 is directed through a blue-violet filter element 71 to reach a mosaic electrode 73 within the camera tube 75. The scanning of this mosaic occurs cophaseally and simultaneously with that in the other camera tubes already described so that output signals from the tube 75 representative of the blue (blue-violet) image are directed through conductor 77 and into an amplifier unit 79 herein termed the blue amplifier in that the blue signals are amplified. This amplifier is of the same general type above explained for the amplifiers receiving lights of other colors from the other camera tubes. The output of the amplifier 79 is fed through conductor 81 to control the operation of output amplifier 83.

The amplifiers 53, 69 and 83 amplifying the output signals representative of red, green and blue, for instance, feed the output signals through conductors 85, 87 and 89 into signal output channels designated respectively as "R," "G" and "B" so as to identify them as to color in that they transmit signals representative of the red, the green and the blue components respectively. Each of these amplifiers 53, 69 and 83 may include a mixing tube conventionally represented herein respectively as the tubes 91, 93 and 95 which have the red signals supplied to the inner grid of tube 91 by way of conductor 51, the green signals supplied to the inner grid 99 by way of the conductor 67 feeding the output from the green amplifier 65 and lastly, the inner grid 101 of the tube 95 which receives the output of the blue amplifier 79 by way of conductor 81.

It was above explained and it is an essential part of the present invention that the signal output of the key amplifier 31 shall control not only the key signal output channel by way of amplifier 35 but shall also control individually (though to a lesser extent or partially) the amplifiers for the red, the green and the blue signals. Accordingly, the signals developed from the key amplifier 31 are fed by way of conductor 103 and through potentiometers 105, 107 and 109 to influence respectively an outer grid element 111, 113 and 115 of the mixer tubes 91, 93 and 95 for the red, the green and the blue channels. In accordance with the setting of the slider element of each of the potentiometers 105, 107 and 109, the amount of signals from the key amplifier which is fed into the channels for the red, the green and blue signals will be determined so that a continuous control within the predetermined amplitude ranges is provided for each portion or element of the component color signals, with the control being in accordance with the spacially homologous portion of the key image signals and thereby a control is achieved which will provide for concurrently varying the component color signals directly in accordance with the key image signal in the receiver instrumentality which, for instance, although not necessarily, may be a unit of the general type described and claimed in my copending applications—Serial Nos. 548,238, now Patent No. 2,481,839; 548,239, now abandoned, and 548,240, now Patent No. 2,431,115, all filed on August 5, 1944. The output signals appearing in the different output channels associated with the conductors 37, 85, 87 and 89 will appropriately control the production at receiving or monitoring points of the key image, as well as the red, the green and the blue component color images which are thus simultaneously to be produced and with the production of all of these images of the resultant combination thereof in an additive sense, observers at receiving points will visualize a corrected image in which substantial improvements in color rendition, brightness and gradation range, as well as maximum highlights brightness and great detail or delineation are observable. In this connection, it should be borne in mind that the system herein disclosed is directly applicable to the so-called additive process and has such major distinctions from arrangements of the so-called subtractive type wherein it has already been proposed to provide a so-called black printer image which affects the image resultant by darkening the shadows without in any way brightening the highlights which are improved by the arrangement of the presently disclosed system.

In connection with the red, green and blue-violet filters 41, 57 and 71 respectively, it may be pointed out that these may be of such densities as to compensate largely for losses occurring due to the use of the half-silvered mirror system, which, it will be appreciated, would be such that only one-eighth of the light intensity in the optical system 13 will reach the blue filter 71, only one-fourth light intensity would reach the green filter 57 and only one-half light would reach the red filter 41, due to absorptions within the mirror. Thus, by appropriate choice of filter density or by appropriate variations in amplification levels attained in the amplifiers 49, 65 and 79, compensation may be had for filter losses.

Having now described the invention, what is claimed and desired to be secured by Letters Patent is the following:

1. The method of color television which comprises producing a plurality of independent series of signals each representing an optical image in one only of a predetermined number of different component colors collectively constituting an additive color system, simultaneously producing an additional series of signals representative of the intrinsic brightness of the image, controlling the signal output of the independent series of signals representative of each component color independently of one another under the influence of the signals representative of the intrinsic brightness of the image and simultaneously transmitting all of the intrinsic brightness and controlled component color signals.

2. The method of developing signal wave trains for color television transmissions comprising producing simultaneously a plurality of independent series of signals each representing an optical image in different colors of a predetermined number of component colors collectively constituting an additive color system, simultaneously producing an additional series of signals representative of the visual brightness of the image, controlling the signal output of the several series of signals representative of each component color independently of one another under the influence of the signals representative of the visual brightness of the image and transmitting all of the signals simultaneously.

3. A system of color television comprising means for producing a plurality of independent series of signals each representing an optical image in one only of a predetermined number of different component colors collectively constituting an additive color system, means for simultaneously producing an additional series of signals representative of the intrinsic brightness of the image, means for controlling the signal output of the independent series of signals representative of each component color independently of one another under the influence of the signals representative of the intrinsic brightness of the image and means for simultaneously transmitting all of the controlled and controlling signals.

4. A color television system comprising means for producing a plurality of independent signal wave trains each representing an optical image in different predetermined component colors collectively constituting the colors of an additive color system, means for simultaneously producing an additional signal wave train representative of the intrinsic brightness of all colors of the image, means for controlling the signal output level of each of the independent signal wave trains representative of each component color independently of one another by the signals representative of the intrinsic brightness of the image, and means for concurrently controlling transmitting media by the intrinsic brightness signals.

5. A color television system comprising a plurality of camera tubes for simultaneously producing independent signal wave trains each representing an optical image directed thereupon, a plurality of color filter elements positioned to pass light in one component color only to each camera tube where the several chosen component colors collectively constitute an additive color system so that the signal wave train output from each camera tube represents an optical image in one component color, an additional camera tube for simultaneously producing an additional signal wave train representative of the intrinsic brightness of all colors of the image, means for simultaneously controlling the signal output of the plurality of developed signal wave trains representative of each component color independently of one another under the control of the signals representative of the intrinsic brightness of the image and means for simultaneously transmitting all of the controlled and the controlling signal wave train signals.

6. The system claimed in claim 5 comprising, in addition, means to synthesize the production of all of the signals so that each signal developed instantly represents an homologous point in the initial optional image.

7. A system of additive color television comprising means for producing a plurality of component color light images of an original optical image with the several color images corresponding to predetermined selected component colors collectively forming an additive color system, means for simultaneously producing from the original optical image a second optical image representative only of the intrinsic brightness of the original optical image, means for synchronously converting each produced color image and the intrinsic brightness image into electrical signaling wave trains with each wave train instantaneously representing an homologous area of the original optical image, means for separately influencing the signal wave trains representative of each separate component color image by the signal wave train representative of the intrinsic brightness of the image thereby to control the signal output for each component color and means for simultaneously energizing suitable transmission media by all of the produced signals.

8. A system of additive color television comprising means for simultaneously producing a plurality of component color light images of an original optical image with the component colors corresponding to predetermined selected component colors collectively forming an additive color system, means for simultaneously producing from the original optical image a second optical image representative only of the intrinsic brightness of the original optical image, synchronously converting the plurality of produced color images and the intrinsic brightness image into electrical signaling wave trains with each wave train instantaneously representing an homologous area of the original optical image, means for separately modifying the signal wave trains representative of each separate component color image under the control of the signal wave train representative of the intrinsic brightness of the image thereby to control the signal output for each component color and means for simultaneously supplying all of the controlled and the controlling signals to suitable transmission media.

9. A system of additive color television comprising a plurality of light filter means for producing a plurality of component color light images of an original optical image with the component colors corresponding to predetermined selected component colors collectively forming an additive color system, means for simultaneously producing from the original optical image a second optical image representative only of the intrinsic brightness of the original optical image, a light responsive device positioned in the path of each produced image to respond to the light thereof, means for synchronously converting the plurality of produced color images and the intrinsic brightness image as received by the light sensitive devices into electrical signaling wave trains with each wave train instantaneously representing an homologous area of the original optical image, means separately amplifying the signal wave trains representative of each separate component color image, means for separately controlling the amplification of each separate component image signal wave train by the signal wave train representative of the intrinsic brightness of the image thereby to control the signal output for each component color, a load circuit connected to each amplifier output, and means for simultaneously supplying all of the controlled level and the controlling signals to separate load circuits.

ALFRED N. GOLDSMITH.

REFERENCES CITED

The following references are of record in the file of this patent:

UNITED STATES PATENTS

| Number | Name | Date |
|---|---|---|
| 2,253,086 | Murray | Aug. 19, 1941 |
| 2,375,966 | Valensi | May 15, 1945 |
| 2,423,769 | Goldsmith | July 8, 1947 |

FOREIGN PATENTS

| Number | Country | Date |
|---|---|---|
| 524,443 | Great Britain | Aug. 7, 1940 |